United States Patent
Buniatyan (10) Patent No.: US 12,019,710 B2
(45) Date of Patent: Jun. 25, 2024

(54) MANAGING AND STREAMING A PLURALITY OF LARGE-SCALE DATASETS

(71) Applicant: Snark AI, Inc., Menlo Park, CA (US)

(72) Inventor: Davit Buniatyan, Menlo Park, CA (US)

(73) Assignee: SNARK AI, INC., Menlo Park, CA (US)

( * ) Notice: Subject to any disclaimer, the term of this patent is extended or adjusted under 35 U.S.C. 154(b) by 341 days.

(21) Appl. No.: 17/450,848

(22) Filed: Oct. 14, 2021

(65) Prior Publication Data

US 2022/0121880 A1    Apr. 21, 2022

Related U.S. Application Data

(60) Provisional application No. 63/091,926, filed on Oct. 15, 2020.

(51) Int. Cl.
*G06K 9/62*      (2022.01)
*G06F 16/2455*   (2019.01)
(Continued)

(52) U.S. Cl.
CPC .... *G06F 18/2148* (2023.01); *G06F 16/24568* (2019.01); *G06F 16/258* (2019.01); *G06F 18/213* (2023.01); *G06N 20/00* (2019.01)

(58) Field of Classification Search
CPC .......... G06F 18/2148; G06F 16/24568; G06F 16/258; G06F 18/213; G06N 20/00
See application file for complete search history.

(56) References Cited

U.S. PATENT DOCUMENTS

| 2014/0067871 A1* | 3/2014 | Meek | G06F 40/154 |
| | | | 707/E17.044 |
| 2020/0257974 A1 | 8/2020 | Yano et al. | |

(Continued)

FOREIGN PATENT DOCUMENTS

| CN | 109886399 B | 3/2021 |
| EP | 3776289 A1 | 2/2021 |

(Continued)

OTHER PUBLICATIONS

International Search Report and Written Opinion in PCT/US2021/071858 dated Mar. 3, 2022.
(Continued)

*Primary Examiner* — David F Dunphy
(74) *Attorney, Agent, or Firm* — CHIP LAW GROUP (57) ABSTRACT

Provided is a method and system for storing different types of datasets in a unified storage format such as in a tensorial form, and streaming to machine learning frameworks, as if the data is local to the machine. Data elements of large-scale datasets are transformed into a tensorial representation for each data type. The data elements have an arbitrary shape and length and a set of data elements ordered in a multi-dimensional space is treated as a dynamic tensor. Multiple transformation functions are concatenated together as a dependency directed acyclic graph to transform the plurality of large-scale datasets from one form into another. These transformation functions are user-defined, serverless lambda functions. The datasets thus transformed are compressed and stored by selecting a suitable compression and storage strategy or a compression kernel using machine learning, that is personalized for each large-scale dataset.

20 Claims, 3 Drawing Sheets

(51) Int. Cl.
    *G06F 16/25*     (2019.01)
    *G06F 18/213*     (2023.01)
    *G06F 18/214*     (2023.01)
    *G06N 20/00*     (2019.01)

(56) References Cited

U.S. PATENT DOCUMENTS

2020/0311613 A1* 10/2020 Ma .................... G06N 20/20
2021/0097154 A1   4/2021 Mawdsley et al.

FOREIGN PATENT DOCUMENTS

| | | |
|---|---|---|
| JP | 2020113044 A | 7/2020 |
| WO | 2019186140 A1 | 10/2019 |

OTHER PUBLICATIONS

Lianmin Zheng et al., "Ansor: Generating High-Performance Tensor Programs for Deep Learning," arXiv:2006.06762v2, Jun. 2020 [retrieved on Feb. 16, 2022]. Retrieved from.

* cited by examiner

MANAGING AND STREAMING A PLURALITY OF LARGE-SCALE DATASETS

CROSS-REFERENCE TO RELATED APPLICATIONS/INCORPORATION BY REFERENCE

This application claims priority to, and benefit from U.S. Provisional Application Ser. No. 63/091,926, filed on Oct. 15, 2020, entitled "METHOD AND SYSTEM FOR UNIFIED STORAGE AND STREAMING OF DIFFERENT TYPES OF DATA", the entire content of which is hereby incorporated herein by reference.

FIELD

Various embodiments of the present disclosure generally relate to storage and streaming of datasets. Specifically, the present disclosure relates to a method and system for implementing a unified storage format for storing large-scale structured, semi-structured and unstructured datasets and for efficiently streaming the data for machine learning processing.

BACKGROUND

Machine Learning (ML) systems are a driving force of business, transforming every sector of the economy. Even for companies with extensive experience in developing cloud-based enterprise applications with well-funded IT departments, a typical ML lifecycle takes about a month or so to complete.

Architecture of such systems is based on data lake solutions that admit data to be collected from different sources in different forms, the data sources being structured and/or unstructured sources. Most of the widely accepted databases, data lakes and data warehouses efficiently operate on structured data in tabular form. However, a large percentage of daily generated data is in unstructured form. Data types such as, but not limited to, images, videos, audio, text, or point clouds are stored either on a local file system or a cloud object storage as separate files. As a result, operating on the data for machine learning purposes is quite inefficient and oftentimes bottlenecked on access speed and data transfer. In such cases, data scientists spend a considerable amount of time preparing the data.

In distributed environments such as cloud computing, data transfer between machines is a costly operation. It is also necessary to transform existing data beforehand for training or deploying models. Even after the data is prepared and utilized, it continues to be represented in different forms, thus preventing true mining of data and delivering the required business value.

Furthermore, the following limitations in existing data storage and processing techniques/systems need to be addressed:

Data locality: When local servers are available, but data is to be stored in a secure, remote data center or on the cloud, it is required to plan ahead to download specific datasets to a compute machine because the process is time consuming. Sharing preprocessed datasets from one compute machine across the team is slow and error-prone if there are multiple preprocessing pipelines.

Code dependency on local folder structure: People use a folder structure to store images or videos. As a result, the data input pipeline must take into consideration the raw folder structure which creates unnecessary and error-prone code dependency of the dataset folder structure.

Managing preprocessing pipelines: If one wants to run some preprocessing, it would be ideal to save the preprocessed images as a local cache for training. However, it is usually difficult to manage, and version control the preprocessed images locally when there are multiple preprocessing pipelines and when the dataset is huge.

Visualization: It is difficult to visualize the raw data or preprocessed dataset on servers.

Reading a small slice of data: A well-known way of storing data is in a HDF5/TFRecords format and upload to a cloud bucket, however, this involves management of many chunks of HDF5/TFRecords files. If a small slice of data is to be read, it is unclear which HDF5/TFRecords chunk should be loaded. It is also inefficient to load the whole file for a small slice of data.

Synchronization across teams: If multiple users modify the data, a data versioning and synchronization protocol needs to be implemented.

Random-access memory (RAM) management: Whenever a Numpy array is to be created, there are issues of whether the Numpy array is going to fit in the local RAM/disk limit.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A method and system for managing and streaming a plurality of large-scale datasets is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed method and system for implementing a unified storage format for storing large-scale structured, semi-structured and unstructured datasets and streaming to machine learning frameworks, as if the data is local to the machine. The method and system brings together different types of data, structured, semi-structured and unstructured data, and represents them in a unified tensorial form that provides huge advantages in data management.

Figure 1:
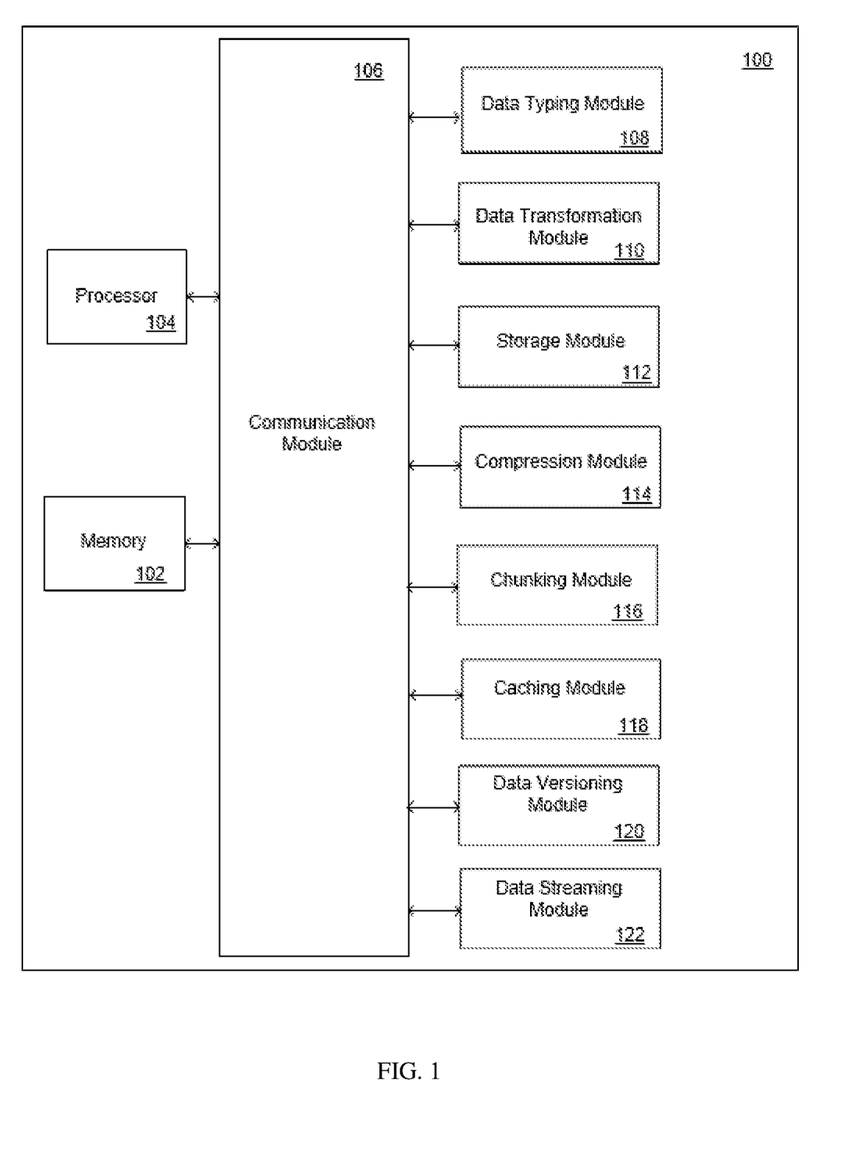
FIG. 1 is a diagram that illustrates a system for managing and streaming a plurality of large-scale datasets, in accordance with an exemplary embodiment of the disclosure.

FIG. 1 is a diagram that illustrates a system for managing and streaming a plurality of large-scale datasets in accordance with an exemplary embodiment of the disclosure. Referring to FIG. 1, there is shown a system 100, which includes a memory 102, a processor 104, a communication module 106, a data typing module 108, a data transformation module 110, a storage module 112, a compression module 114, a chunking module 116, a caching module 118, a data versioning module 120 and a data streaming module 122.

The memory 102 may comprise suitable logic, and/or interfaces, that may be configured to store instructions (for example, computer readable program code) that can implement various aspects of the present disclosure.

The processor 104 may comprise suitable logic, interfaces, and/or code that may be configured to execute the instructions stored in the memory 102 to implement various functionalities of the system 100 in accordance with various aspects of the present disclosure. The processor 104 may be further configured to communicate with various modules of the system 100 via the communication module 106.

The communication module 106 may comprise suitable logic, interfaces, and/or code that may be configured to transmit data between modules, engines, databases, memories, and other components of the system 100 for use in performing the functions discussed herein. The communication module 106 may include one or more communication types and utilizes various communication methods for communication within the system 100.

The data typing module 108 may comprise suitable logic, interfaces, and/or code that may be configured to identify one or more data types associated with a plurality of large-scale datasets. The plurality of large-scale datasets may include, but are not limited to, structured datasets, semi-structured datasets and/or unstructured datasets. The one or more data types may include, but are not limited to, an image, video, text, audio, numbers, and/or point cloud. Each large-scale dataset of the plurality of large-scale datasets includes a plurality of data elements.

In accordance with an embodiment, the data typing module 108 is configured to provide a description corresponding to each data type. A set of data types of varied length is stored into a single unified tensor preserving the shape of each large-scale dataset.

The data transformation module 110 may comprise suitable logic, interfaces, and/or code that may be configured to transform each data element into a set of tensors for each data type. The data elements have an arbitrary shape and length and a set of data elements ordered in a multidimensional space is treated as a dynamic tensor.

The data transformation module 110 receives a plurality of transformation functions concatenated together as a dependency directed acyclic graph to transform the plurality of large-scale datasets from one form into another. The plurality of transformation functions are user-defined, serverless lambda functions which apply arbitrary computation to a single sample or a subsection of a sample of a tensor of the set of tensors or a large-scale dataset. In some embodiments, the plurality of transformation functions defined by the user are applied on a large-scale dataset as a whole by distributing the large-scale dataset to multiple cores locally or to machines on a cloud.

The data transformation module 110 is configured to transform different types of data such as, but not limited to, structured, semi-structured and unstructured data and represent the data as tensors which are considered as first-class citizens. Every data element or data entity is represented, stored and operated in tensorial form. Tensors are further supplemented by metadata. These tensors have the following characteristics:

Scalable: Any dimension of the tensor can have an arbitrary shape, such as, for instance, storing large aerial images.

Dynamic shapes: Each slice of a tensor can have a different length/shape. For example, each aerial image might have different shapes, however a set of aerial images can still be a single tensor.

Recursive tensors (or subtensors): Each object inside a tensor cell can be a tensor or a dictionary of tensors. However, each tensor is homogeneous.

The following illustrates an exemplary process for creating and transforming a dataset.

Firstly, a dataset is defined which consists of the following tensors: "images" as a four-dimensional array with each element being an integer of 8 bits, "labels" as a one-dimensional array with each element being unsigned integers of 32 bits and "importance" as a one-dimensional array consisting of floating numbers described in 32 bits. These tensors may be described in Python language using a proprietary Application Programming Interface (API) which is installed on a machine through a Python module referred to as a 'Hub'. By defining a dataset, meta-information required for filling the information is created, however, the process does not auto-populate tensors.

In an ensuing operation, samples that are elements of tensors are obtained. These samples occupy a first dimension. For instance, a sample may be an image of (512, 512, 3) size pixels corresponding to (width, height and color channels) dimensions. For example, the first dimension of "image" four-dimensional tensor corresponds to a list of images each having three dimensions.

The dataset that was defined is taken into consideration and each tensor is appended to a randomly generated sample. For instance, using Numpy Python library, random integers are generated ranging from 0 to 255 aligned in (512, 512, 3) grid and are appended to "image" tensor. Repeating this process 10,000 times for instance, the "image" tensor would be of size (10,000, 512, 512, 3) of integers described in 8 bits. Similarly, "label" tensor of size (10,000, 1) unsigned integers of 32 bits and "importance" tensor of size (10,000, 1) floating numbers described in 32 bits both randomly populated, are obtained.

Then, using an API in Python, a serverless transformation function is defined that takes a sample and returns a twice down-sampled version of it across spatial dimensions. Those elements that do not have spatial dimensions are kept the same. The following illustrates a high-level example of the serverless transformation function:

1 def down-sample (image, label, importance):
2 image=down-sample (image, factor=2)
3 return image, label, importance Referring to the above example, first line (1) defines a function name and the input parameters. Second line (2) applies a down-sampling function. The down-sampling function takes an image of (512, 512, 3) size and returns an image of (256, 256, 3) size by taking every other pixel across spatial dimensions. On the third line (3), the rest of the elements are kept the same and returned by the function.

The API takes the down-sample function and creates an input dataset stored on the centralized machine consisting of multiple elements (for example, 10,000 elements) with a few tensors (for example, three tensors) and outputs a dataset of multiple elements (for example, 10,000 elements) with each image being down-sampled. When the function gets defined, it does not get executed immediately. An evaluation algorithm takes the function, the reference of input dataset and an empty output dataset to send to a cluster of machines. Then each machine on the cluster only takes a subset of the input dataset, computes the transformation and stores its output in the dataset. For instance, if the cluster had 10 machines, then each machine would only down-sample 1000 images and return the output to the combined dataset.

In accordance with an embodiment, an evaluation function is responsible for scheduling the tasks on each machine and later combining the outputs. Each machine directly stores the processed data on the centralized storage. The evaluation function instead of taking a single down-sampling transformation and executing on a cluster, can take a sequence of transformations defined similarly as down-sampling. An exemplary sequence of transformations may include, crop the image, rotate it by 90 degrees and then down-sample it. This sequence along with the input dataset are passed to the cluster of machines. Each machine executes those transformations in sequence on the subset of the dataset and stores the outputs on the centralized storage.

In accordance with another embodiment, instead of having a sequence of predefined transformations, a more complicated ordering of the transformations may be used that can be executed at the same time. These transformations are defined in directed acyclic graphs where each node is a state of the sample and a directed connection as a transformation from sample state to another state. These graphs may be defined using the API in Python language and is provided to the evaluation function. The evaluation function considering the directed acyclic graph of transformations, starts scheduling on the cluster of machines in an order in which to execute those functions. A graph execution of transformations from filenames to a dataset that is training a model is illustrated as follows in accordance with an exemplary implementation:

A list of file paths of images is provided in a folder. Instead of iteratively adding samples to a dataset on the main process, a first serverless function is defined that takes as input a filename or path. The serverless function reads the filename or path and adds it to the dataset.

A second transformation function connects to the output of the first serverless function. This second transformation functions takes as input image tensors, crops the image tensors and down samples them.

In parallel to the second transformation function, a third transformation function takes as input, the output of the first transformation function, namely an image tensor, and sends it to an external API or a deep learning model to generate embeddings as an adjacent tensor.

A fourth transformation function takes the embedding and cropped/down sampled image tensors and filters them based on user-defined criteria based on clusters by embeddings.

A machine learning model is then trained based on the output on the fourth transformation function.

Figure 2:
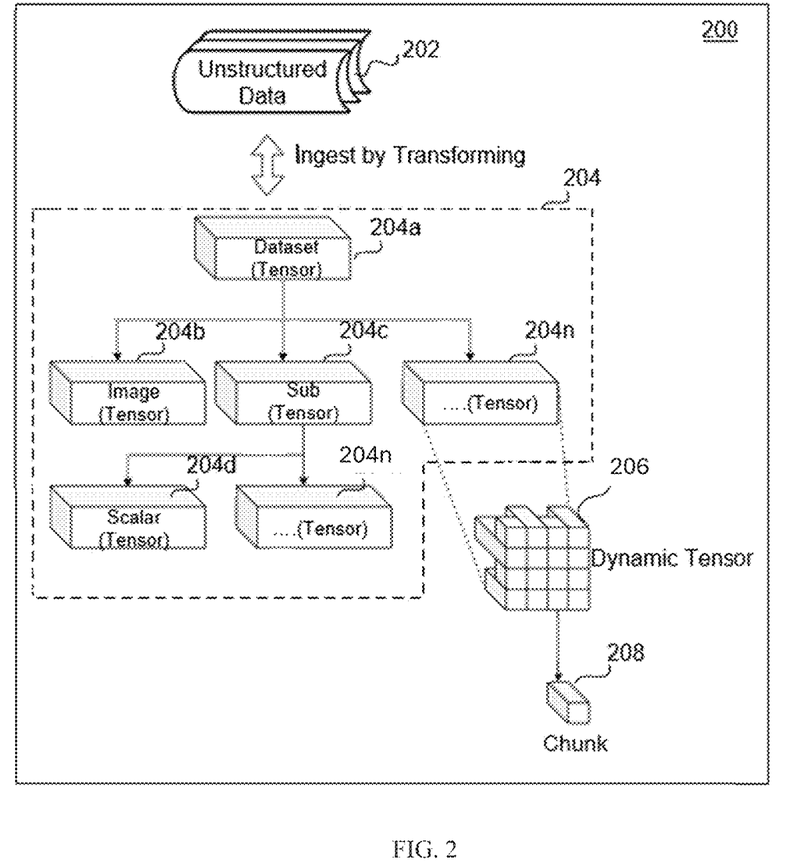
FIG. 2 is a diagram depicting the steps of storing large-scale datasets as tensors, in accordance with an exemplary embodiment of the disclosure.

The process of storing datasets as tensors is further illustrated in detail in conjunction with FIG. 2.

The data transformation module 110 is further configured to map and compute remotely one or more transformation functions to create a new large-scale dataset and store the new large-scale dataset on a storage device. The data transformation module 110 is also configured to transform existing tensors/datasets into new ones.

The storage module 112 may comprise suitable logic, interfaces, and/or code that may be configured to store, at a storage device, based on each data type, the plurality of large-scale datasets that have been transformed. The storage module 112 simplifies dataset handling regardless of data location, format or size. Datasets can be stored on any cloud or file system. Smart compression is also performed depending on the type of data.

The compression module 114 may comprise suitable logic, interfaces, and/or code that may be configured to select a compression and storage strategy prior to storing the plurality of large-scale datasets. The compression module 114 uses machine learning to identify a suitable compression kernel that is personalized for each large-scale dataset of the plurality of large-scale datasets.

The data typing module 108 efficiently describes the data types the tensors support, thus enabling implementation of proper compression and storage strategies. The compression module 114 is responsible for transforming tensor data into binary format to be stored in a storage. This transformation process includes encoding, compression and encryption.

The chunking module 116 may comprise suitable logic, interfaces, and/or code that may be configured to perform chunking of each tensor in the set of tensors into one or more chunks, and storing the one or more chunks either locally on a file system or on a remote storage. The remote storage may include, but is not limited to, an object storage or a conventional database.

The chunking module 116 is configured to efficiently chunk tensors in order to store and stream tensors. When a program queries the tensor for a specific slice, an integration layer in system 100 checks which chunk contains the sample to download. In a next query, the system 100 checks if the existing chunk contains the required slice before fetching it from the cloud. Within the program's context, tensors that are stored in a remote chunked object storage appear to be local tensors to operate on.

The caching module 118 may comprise suitable logic, interfaces, and/or code that may be configured to store the one or more chunks in a memory for accessing slices within a chunk, since accessing a single slice requires downloading the corresponding chunk. Thus, caching significantly enhances the speed for accessing the data for machine learning purposes.

The data versioning module 120 may comprise suitable logic, interfaces, and/or code that may be configured to perform unique versioning of the plurality of large-scale datasets. A difference operator is expressed in terms of tensors and a sequence of commits is expressed as a superposition of linear transformations.

The data streaming module 122 may comprise suitable logic, interfaces, and/or code that may be configured to integrate with Deep Learning frameworks such as, but not limited to, PyTorch and TensorFlow, to natively support asynchronous fetching of one or more large-scale datasets from a local storage to a Graphics Processing Unit (GPU) using one or more data loaders. Any deep learning application is enabled to, without further modification, take advantage of the highly scalable storage. The deep learning training iteration is usually bounded by the compute cycles on GPUs.

Once the datasets are transformed on a cluster (i.e. images get cropped, rotated and down-sampled) and then stored in a centralized storage, a machine learning model is trained that classifies "image" to the corresponding "label".

To train the machine learning model on a given dataset, a machine downloads the data from the centralized storage to the local dataset and starts training a classifier. Training a classifier involves using a model and updating its parameters to minimize the error rate. When the dataset size exceeds the local storage capacity of a single machine inside a cluster, the machine can no longer train the model since it runs out of memory. Instead, the dataset is streamed from the centralized storage to the machine over the network in real-time while the model is processing the data, thus ensuring full utilization of computing resources and obtaining data transfer speed equivalent to a local attached storage. Hence, large datasets are trained on the cloud machines without storage limitations. Since each machine is no longer limited to a local storage capacity to process and train data, petabyte scale datasets may be transformed and trained on clusters of machines at the same time.

For instance, consider aerial images stored on a cloud object storage that are incapable of being copied to cloud compute machines, as the dataset size exceeds the storage capacity of a single machine. In this context, the data streaming module 122 enables direct streaming from the storage to the GPU utilizing the network and hence enables large dataset training on the cloud compute machines. Since each cloud compute machine can have up to a petabyte scale dataset view without a local attached storage, multiple cloud compute machines may be used for distributed training of models, which provides for faster training.

By combining the distributed remote storage and asynchronous data fetching, the training speed is the same as if the data was stored locally on a machine with respect to the following constraints:

Network locality: It is assumed that computational nodes that access the data are physically located near object storage servers connected with high-bandwidth networks.

Chunk size: The chunk size is well chosen with respect to latency to maximize the throughput. The chunk size may be in the range 12-24 MB, however, the chunk size may be tuned for custom infrastructure set-up such as on-premise deployment.

FIG. 2 is a diagram that depicts the steps of storing datasets as tensors in accordance with an exemplary embodiment of the disclosure. Referring to FIG. 2, there is shown a schematic 200, which depicts unstructured data 202, datasets represented as tensors 204 (dataset tensor 204a, image tensor 204b, sub tensor 204c, scalar tensor 204d, . . . tensor 204n), a dynamic tensor 206 and a chunk 208.

The unstructured data 202 are ingested to storage by transforming the unstructured data 202 to the datasets represented as tensors 204. The datasets represented as tensors 204 consist of multiple tensors or a dictionary of tensors that may include, but are not limited to, dataset tensor 204a, image tensor 204b, sub tensor 204c, scalar tensor 204d, . . . tensor 204n. Essentially, a dataset is a dictionary of single dimensional tensors. Tensors include types that may include, but are not limited to, images, videos, text, point clouds, and sequences which restrict the shape, type, chunking or the compression strategies. A group of tensors may have dynamic shapes, that may be extended in any direction and form the dynamic tensor 206. The dynamic tensor 206 is automatically chunked to form the chunk 208 and can be mapped to a file system, an object storage or an in-memory database. This helps to compensate for example, time series or multi-shape aerial images.

Figure 3:
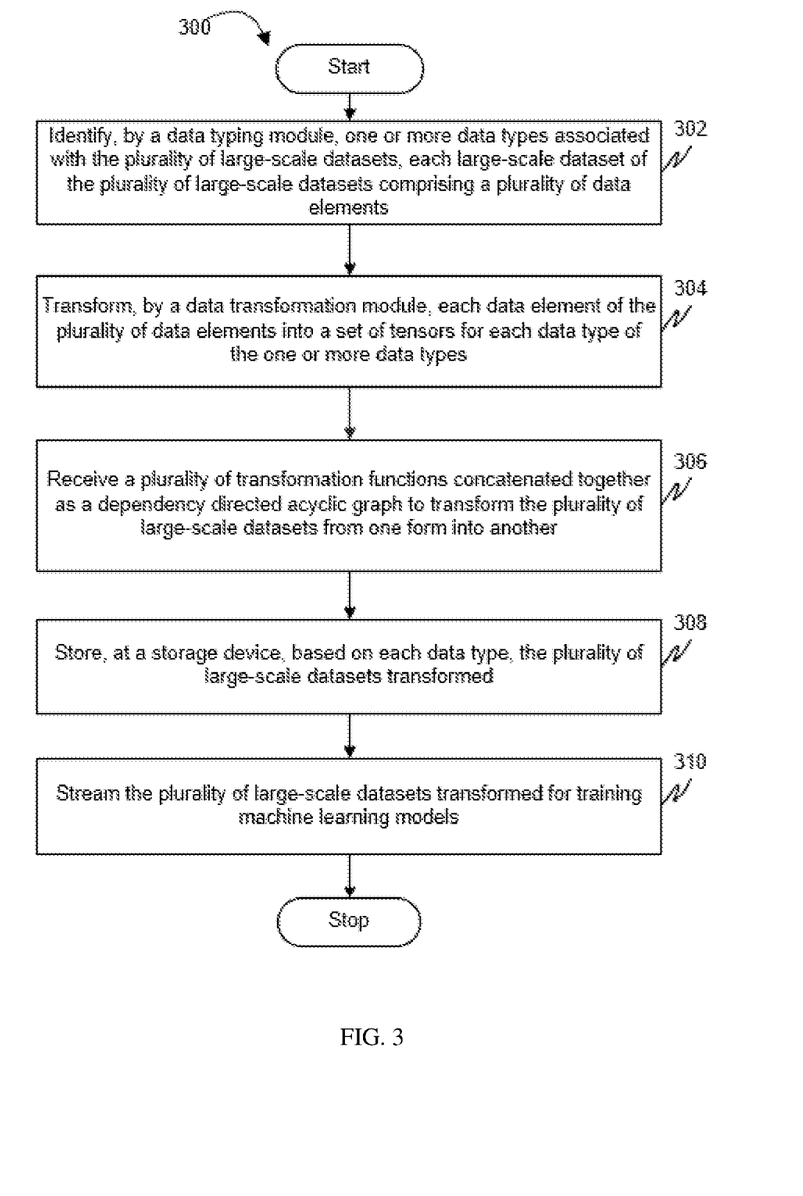
FIG. 3 is a flowchart that illustrates a method for managing and streaming a plurality of large-scale datasets, in accordance with an exemplary embodiment of the disclosure.

FIG. 3 is a flowchart that illustrates a method for managing and streaming a plurality of large-scale datasets in accordance with an exemplary embodiment of the disclosure. Referring to FIG. 3, there is shown a flowchart 300 for managing and streaming the plurality of large-scale datasets.

At 302, identify, by a data typing module, one or more data types associated with the plurality of large-scale datasets, each large-scale dataset of the plurality of large-scale datasets comprising a plurality of data elements. The data typing module 108 is configured to identify the one or more data types associated with the plurality of large-scale datasets.

At 304, transform, by a data transformation module, each data element of the plurality of data elements into a set of tensors for each data type of the one or more data types. The data transformation module 110 is configured to transform each data element into a set of tensors for each data type. The data elements have an arbitrary shape and length and a set of data elements ordered in a multi-dimensional space is treated as a dynamic tensor.

At 306, receive a plurality of transformation functions concatenated together as a dependency directed acyclic graph to transform the plurality of large-scale datasets from one form into another. The data transformation module 110 receives a plurality of transformation functions concatenated together as a dependency directed acyclic graph to transform the plurality of large-scale datasets from one form into another. The plurality of transformation functions are user-defined, serverless lambda functions which apply arbitrary computation to a single sample or a subsection of a sample of a tensor of the set of tensors or a large-scale dataset.

At 308, store, at a storage device, based on each data type, the plurality of large-scale datasets transformed. The storage module 112 is configured to store, at the storage device, based on each data type, the plurality of large-scale datasets that have been transformed. The storage module 112 simplifies dataset handling regardless of data location, format or size. Datasets can be stored on any cloud or file system. Smart compression is also performed depending on the type of data. The compression module 114 is configured to select a compression and storage strategy prior to storing the plurality of large-scale datasets. The compression module 114 uses machine learning to identify a suitable compression kernel that is personalized for each large-scale dataset of the plurality of large-scale datasets.

At 310, stream the plurality of large-scale datasets transformed for training machine learning models. Once the plurality of large-scale datasets have been transformed, the datasets are streamed for training or deploying machine learning models.

The system of the present disclosure is advantageous in that it is scalable with fast read/write access unlike a network file system. Compared to storing files in object storage, the system eliminates latency for retrieving the data. The data can be transferred to the processing unit over the network with the same speed as reading from the local storage of the machine. Each machine virtually has the same view of the dataset and is not limited to local resources only. This enables training and deploying machine learning models at petabyte scale involving thousands of virtual machines as if operating on a single computer.

Further, early experiments on real world applications such as storing and processing a dozen thousand aerial images and 80 million text documents demonstrated three times faster inference at 0.5 times the cloud computing cost and thirty percent less storage requirements. Computational cost and time savings are a result of asynchronous machine computations without waiting for the data to be downloaded.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A method for managing and streaming a plurality of large-scale datasets, the method comprising:
   identifying, by one or more processors, one or more data types associated with the plurality of large-scale datasets, each large-scale dataset of the plurality of large-scale datasets comprising a plurality of data elements;
   transforming, by the one or more processors, each data element of the plurality of data elements into a set of tensors for each data type of the one or more data types, wherein the each data element of the plurality of data elements has an arbitrary shape and length and a set of data elements of the plurality of data elements ordered in a multi-dimensional space is treated as a dynamic tensor, wherein the transforming comprises:
   receiving a plurality of transformation functions concatenated together as a dependency directed acyclic graph to transform the plurality of large-scale datasets from one form into another, wherein the plurality of transformation functions are user-defined, serverless lambda functions which apply arbitrary computation to a single sample or a subsection of a sample of a tensor of the set of tensors or a large-scale dataset of the plurality of large-scale datasets; and
   storing, at a storage device, based on each data type, the plurality of large-scale datasets transformed, wherein the storing comprises selecting, by the one or more processors, a compression and storage strategy, wherein a suitable compression kernel that is personalized for each large-scale dataset of the plurality of large-scale datasets is identified.

2. The method of claim 1, wherein the plurality of large-scale datasets comprise at least one of structured datasets, semi-structured datasets and/or unstructured datasets.

3. The method of claim 1, wherein the one or more data types comprise at least one of an image, video, text, audio, numbers, and/or point cloud.

4. The method of claim 1 further comprising providing, by the one or more processors, a description corresponding to each data type, wherein a set of data types of the one or more data types of varied length is stored into a single unified tensor preserving a shape of each large-scale dataset of the plurality of large-scale datasets.

5. The method of claim 1, wherein the plurality of transformation functions that is user-defined is applied on a large-scale dataset of the plurality of large-scale datasets as a whole by distributing the large-scale dataset to multiple cores locally or to machines on a cloud.

6. The method of claim 1, wherein the transforming further comprises mapping and computing remotely one or more transformation functions of the plurality of transformation functions to create a new large-scale dataset and storing the new large-scale dataset on the storage device.

7. The method of claim 1, wherein the storing comprises performing chunking, by the one or more processors, of each tensor in the set of tensors into one or more chunks, and storing the one or more chunks either locally on a file system or on a remote storage, wherein the remote storage comprises at least one of an object storage or a conventional database.

8. The method of claim 7 further comprising storing, by the one or more processors, the one or more chunks in a memory for accessing slices within a chunk of the one or more chunks.

9. The method of claim 1 further comprising, performing, by the one or more processors, unique versioning of the plurality of large-scale datasets, wherein a difference operator is expressed in terms of tensors and a sequence of commits is expressed as a superposition of linear transformations.

10. The method of claim 1 further comprising, performing asynchronous fetching of one or more large-scale datasets of the plurality of large-scale datasets from a local storage to a Graphics Processing Unit (GPU) using one or more data loaders, for training one or more machine learning models of a deep learning framework integrated with the plurality of large-scale datasets.

11. A system for managing and streaming a plurality of large-scale datasets, the system comprising:
   a memory;
   a processor communicatively coupled to the memory, wherein the processor is configured to:
   identify one or more data types associated with the plurality of large-scale datasets, each large-scale dataset of the plurality of large-scale datasets comprising a plurality of data elements;
   transform each data element of the plurality of data elements into a set of tensors for each data type of the one or more data types, wherein the each data element of the plurality of data elements has an arbitrary shape and length and a set of data elements of the plurality of data elements ordered in a multi-dimensional space is treated as a dynamic tensor, wherein the processor is configured to:
   receive a plurality of transformation functions concatenated together as a dependency directed acyclic graph to transform the plurality of large-scale datasets from one form into another, wherein the plurality of transformation functions are user-defined, serverless lambda functions which apply arbitrary computation to a single sample or a subsection of a sample of a tensor of the set of tensors or a large-scale dataset of the plurality of large-scale datasets; and store, at a storage device, based on each data type, the plurality of large-scale datasets transformed, wherein the processor is configured to select a compression and storage strategy, wherein a suitable compression kernel that is personalized for each large-scale dataset of the plurality of large-scale datasets is identified.

12. The system of claim 11, wherein the plurality of large-scale datasets comprise at least one of structured datasets, semi-structured datasets and/or unstructured datasets.

13. The system of claim 11, wherein the one or more data types comprise at least one of an image, video, text, audio, numbers, and/or point cloud.

14. The system of claim 11, wherein the processor is configured to provide a description corresponding to each data type, wherein a set of data types of the one or more data types of varied length is stored into a single unified tensor preserving a shape of each large-scale dataset of the plurality of large-scale datasets.

15. The system of claim 11, wherein the plurality of transformation functions that is user-defined is are applied on a large-scale dataset of the plurality of large-scale datasets as a whole by distributing the large-scale dataset to multiple cores locally or to machines on a cloud.

16. The system of claim 11, wherein the processor is configured to map and compute remotely one or more transformation functions of the plurality of transformation functions to create a new large-scale dataset and store the new large-scale dataset on the storage device.

17. The system of claim 11, wherein the processor is configured to perform chunking of each tensor in the set of tensors into one or more chunks, and store the one or more chunks either locally on a file system or on a remote storage, wherein the remote storage comprises at least one of an object storage or a conventional database.

18. The system of claim 17, wherein the processor is configured to store the one or more chunks in a memory for accessing slices within a chunk of the one or more chunks.

19. The system of claim 11, wherein the processor is configured to perform unique versioning of the plurality of large-scale datasets, wherein a difference operator is expressed in terms of tensors and a sequence of commits is expressed as a superposition of linear transformations.

20. The system of claim 11, wherein the processor is configured to perform asynchronous fetching of one or more large-scale datasets of the plurality of large-scale datasets from a local storage to a Graphics Processing Unit (GPU) using one or more data loaders.

* * * * *